US006396915B1

(12) United States Patent
Springer et al.

(10) Patent No.: US 6,396,915 B1
(45) Date of Patent: May 28, 2002

(54) COUNTRY TO DOMESTIC CALL INTERCEPT PROCESS (CIP)

(75) Inventors: Arthur L. Springer, Waterloo, IA (US); Dean Marchand, Brighton, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/464,789

(22) Filed: Dec. 17, 1999

(51) Int. Cl.[7] .............................................. H04M 17/00
(52) U.S. Cl. ....................... 379/145; 379/112; 379/144; 379/145; 379/133
(58) Field of Search ................................ 379/112, 133, 379/134, 144, 145, 203, 201, 222, 223

(56) References Cited

U.S. PATENT DOCUMENTS

| | | | |
|---|---|---|---|
| 5,345,595 A | | 9/1994 | Johnson et al. ............. 455/33.1 |
| 5,463,681 A | | 10/1995 | Vaios et al. ................. 379/189 |
| 5,566,234 A | * | 10/1996 | Reed et al. ................. 379/145 |
| 5,602,906 A | * | 2/1997 | Phelps ....................... 379/114 |
| 5,638,431 A | * | 6/1997 | Everett et al. .............. 379/115 |
| 5,768,354 A | * | 6/1998 | Lange et al. ................ 379/189 |
| 5,805,686 A | | 9/1998 | Moller et al. ............... 379/198 |
| 5,809,125 A | | 9/1998 | Gammino ................... 379/189 |
| 5,867,566 A | * | 2/1999 | Hogan et al. ............... 379/115 |
| 5,875,236 A | * | 2/1999 | Jankowitz et al. .......... 379/114 |
| 5,907,602 A | * | 5/1999 | Peel et al. .................. 379/114 |
| 5,970,405 A | | 10/1999 | Kaplan et al. .............. 455/410 |
| 5,988,497 A | | 11/1999 | Wallace .................... 235/382.5 |
| 6,163,604 A | | 12/2000 | Baulier et al. .............. 379/189 |

* cited by examiner

Primary Examiner—Duc Nguyen
Assistant Examiner—Quoc D. Tran

(57) ABSTRACT

A call intercept process (CIP) for calling card calls originating from an international country and terminating to high fraud domestic USA, and Canada locations. When a call is placed via a calling card and terminates to a high fraud domestic location, the call is optionally screened against a database which keys on international originating country access numbers. Whether this screening implemented, the call is routed to a first level operator in order to verify the billing account information of the caller as an authorized user. This verification is based on customer and business name, address, zip code, and phone number. If the caller passes verification, a CIP process automatically overrides the calling card from any future Intercepts. If caller fails account verification, the a CIP process automatically places the card in a 'LOCKED STATUS MODE' which mode indicates that any additional calls based on that card be intercepted regardless of termination. At any time the caller passes verification, the card is lifted and placed in an override process via the CIP process. Pass and failed alerts are generated and passed to a fraud system, in real time, to allow for notification of outcome to all fraud analysts. An additional process enables call intercept failures at a first level operator to fail to a second level operator which allows for further verification and research on customer identity and account to take place.

11 Claims, 3 Drawing Sheets

COUNTRY TO DOMESTIC CALL INTERCEPT PROCESS (CIP)

BACKGROUND OF THE INVENTION

1. Field of the Invention

The present invention relates to the field of telecommunications, and, particularly, to a call-intercept system and method implemented for long distance telephone systems that verifies call identities in order to prevent fraudulent calling card usage.

2. Description of the Prior Art

The telecommunication industry has estimated fraud losses are costing telecommunication service providers five (5) billion dollars per year. Particularly, telecommunication fraud losses are attributed to lost, stolen, or compromised portable calling card products, e.g., in highly populated areas. Calling card products may be compromised in various ways, for example, via social engineering, "shoulder surfing", etc., whereby a perpetrator obtains a physical calling card or calling card number belonging to another. The final result for the perpetrator is to obtain a calling card product in order to place a call to desired location or termination, whether domestic or international.

Residential customers of large telecommunication service providers, e.g., MCI WorldCom, are typically the prey for these types of fraud, and, industry studies have determined that the fraud losses will only increase in the future.

While service providers may place controls within their networks to limit or block outbound international calls, i.e., from a specific domestic origination in the United States to a specific international country termination, fraud still persists in the form of compromised calling card calls that originate from a specific country and terminate at domestic locations. This is done by circumventing the blocks placed on outbound internationals with an international inbound call to a domestic number in the United States.

It would be highly desirable to provide a system for intercepting first time callers terminating a call to a predefined domestic location from a specific international origination in order to verify the identity of the caller and control fraudulent calling card usage.

SUMMARY OF THE INVENTION

The present invention is directed to a call intercept process (CIP) that functions to intercept callers placing compromised calling card calls for a first time from international locations to predefined high-fraud domestic (U.S.) terminations, in order to verify the identity of the caller. In operation, a perpetrator who has obtained a calling card product, will have only the physical calling card or the calling card number itself. When the perpetrator attempts to terminate a calling card call to a predefined domestic termination, the calling card call will default to an operator, who will ask for the name and account information as it appears on the calling card owner's billing account. The operator will fail the call if the perpetrator disconnects the call or is unable to provide correct name and address billing information as it appears on the account.

Thus, the system of the invention provides the ability to intercept and verify account information with first time calling card callers placing calling card calls from an international origination to a specific domestic termination. If the caller fails or hangs up, the card is placed in a "locked status" mode and will be intercepted regardless of the termination location until such time the caller passes an account verification requirement. Once the caller passes, the CIP process places the card in a database and the card is over-ridden from customer interruption with intercept on future calls.

Advantageously, passed and failed call intercept calls may then generate alarms for monitoring by a fraud control system. The fraud control system will review the alarms to determine if actions are warranted to block the calling card.

DETAILED DESCRIPTION OF THE PREFERRED EMBODIMENTS

Call intercept is the process of intercepting callers, calling for the first time from international locations to predefined high fraud domestic terminations, in order to verify the identity of the caller.

Figure 1:
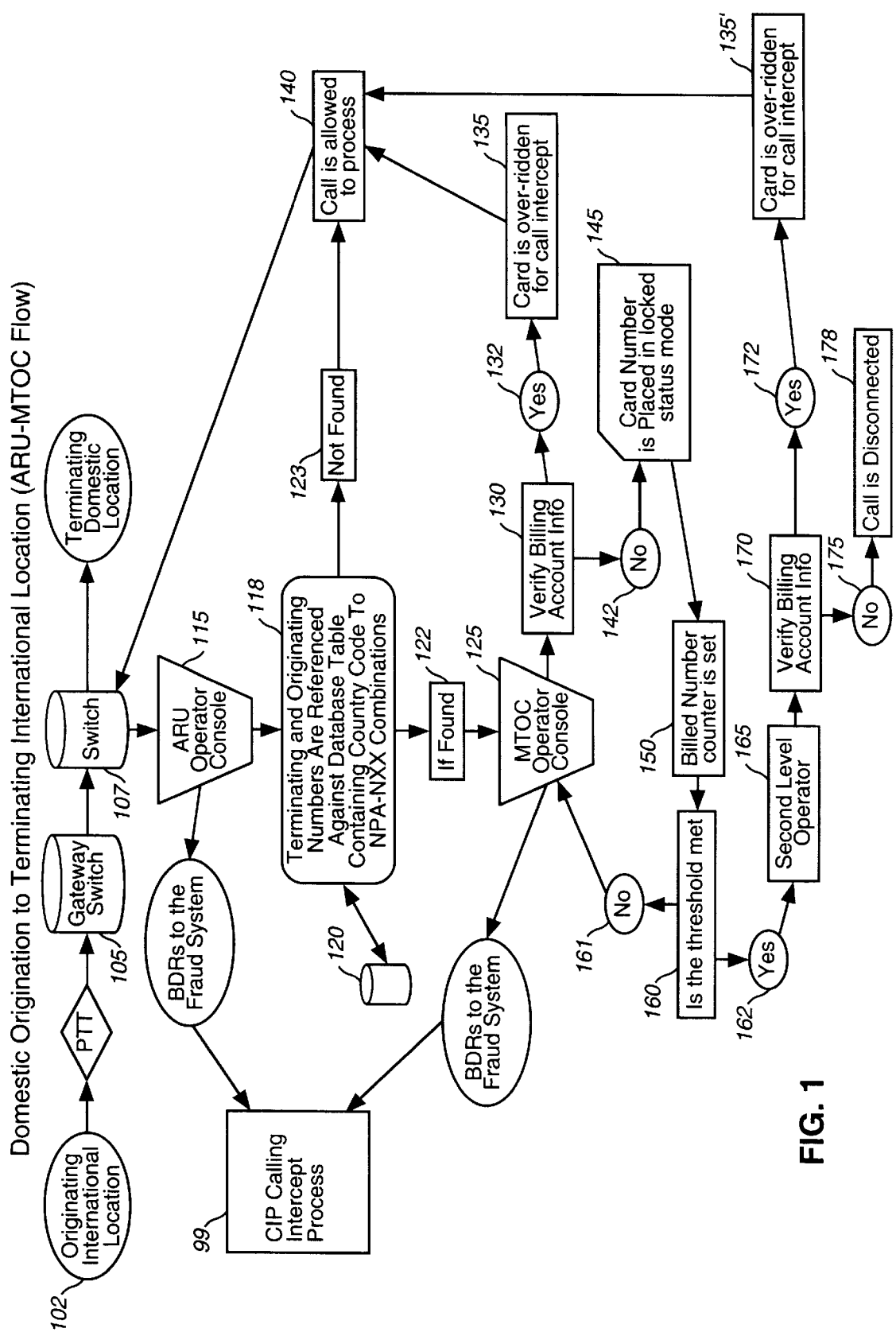
FIG. 1 illustrates a telecommunication system implementing the call intercept process for calls originating from international locations to domestic terminations according to a first embodiment of the invention.

FIG. 1 illustrates the inventive system 100 implementing the call intercept process according to a first embodiment of the invention. In this first embodiment, the caller will dial a calling card access number from an originating international location 102. The call is routed over that country's postal, telegraph, and telephone (PTT) organization which is usually a governmental department functioning as the nation's common carrier providing nationalized telephone and telegraph services, and, additionally, through a gateway switch 105 where the call is received at a domestic telecommunications switch 107 where it is directed to an automated response unit 115. The caller is then prompted to input a calling card and terminating number by the Automated Response Unit (ARU) 115, which is also referred to as the Automated Operator Console. At block 118, the ARU will reference the originating country location and terminating number against a Screening of International Call Intercept database table 120. Preferably, the Screening of International Call Intercept database table 120 comprises a list that includes combinations of country code numbers to NPA and NPA-NXX terminations where calling card callers may frequently attempt to call. If the originating country code and NPA-NXX termination combination is not found in the Call Intercept database table at block 123, the card is allowed to process as indicated at block 140 and is routed via terminating switch 107 to the domestic termination. If the originating country code and NPA-NXX termination combination is found by screening the international call intercept database 120, as indicated at 122, the call is defaulted from the ARU to a Manual Transfer Operator Console (MTOC) 125, which is also referred to as the Manual Operator Console.

As indicated at block 130, FIG. 1, the MTOC operator will then prompt the caller for the correct billing account information including the customer and/or business name, address, zip code, and phone number as it appears on the billing account. If the caller provides correct information at 132, the card is over-ridden for call intercept by the Call Intercept Process (CIP) at block 135, and the card is placed in a Billed Number Screening database (BNS) 120 to allow the card call to process, as indicated at step 140. Specifically, a detail record is cut and fed to a mainframe CIP process 99 that automatically overrides the calling card from any future intercepts by setting an 'Override' flag associated with that calling card number. This detail record is populated uniquely to allow for the fraud system to alarm the call with a 'Caller Pass Verification alert'.

If the caller provides incorrect name and address or disconnects the call at 142, the call is denied via the CIP process and the card is placed in Intercept-Locked status mode as indicated at 145. Preferably, if the caller fails account verification, a detail record is cut and passed to the CIP mainframe process 99 where the card is automatically placed in a 'LOCKED STATUS MODE' which will allow for any additional calls to be intercepted based on the card regardless of termination. That is, an 'Intercept-Locked' flag associated with that calling card number is set so that future attempts made using that calling card will be defaulted to an operator. The next time the calling card number is used, regardless of the terminating location, the caller will be defaulted to a MTOC, where the operator will attempt to verify name and address.

As indicated at block 150 in FIG. 1, a billing number counter is set, i.e., incremented, to track the number of call card attempts using that calling card. If subsequent calling card call attempts fail a predefined number of times at the MTOC, as indicated at 160, 162, the caller is then transferred to a second level operator/customer service center, as shown at 165. Preferably, the calling call failure threshold is set at five (times) but it is understood that the threshold is configurable. If the calling call failure threshold is not met at step 161, the call is returned to the MTOC which generates the billing data record indicating the Intercept-Locked status mode for the database. Furthermore, the card number will remain in the BNS database assigned the Intercept-Locked status mode.

At block 170, after transference of the call to the second level operator, the operator will then attempt to verify the identity of the caller, e.g., billing account information pertaining to the calling card. At block 172, if the caller provides the correct account information, the card is over-ridden for call intercept through the CIP process logic at 135', and the call is allowed to complete. Thus, the status flag associated with the calling card number is assigned the 'Override' flag to prevent a future interception. If the caller provides incorrect name and address at block 175 the call will be disconnected at block 178, and the card number will remain in the Billed Number Screening database in the Intercept-Locked status mode.

Figure 2:
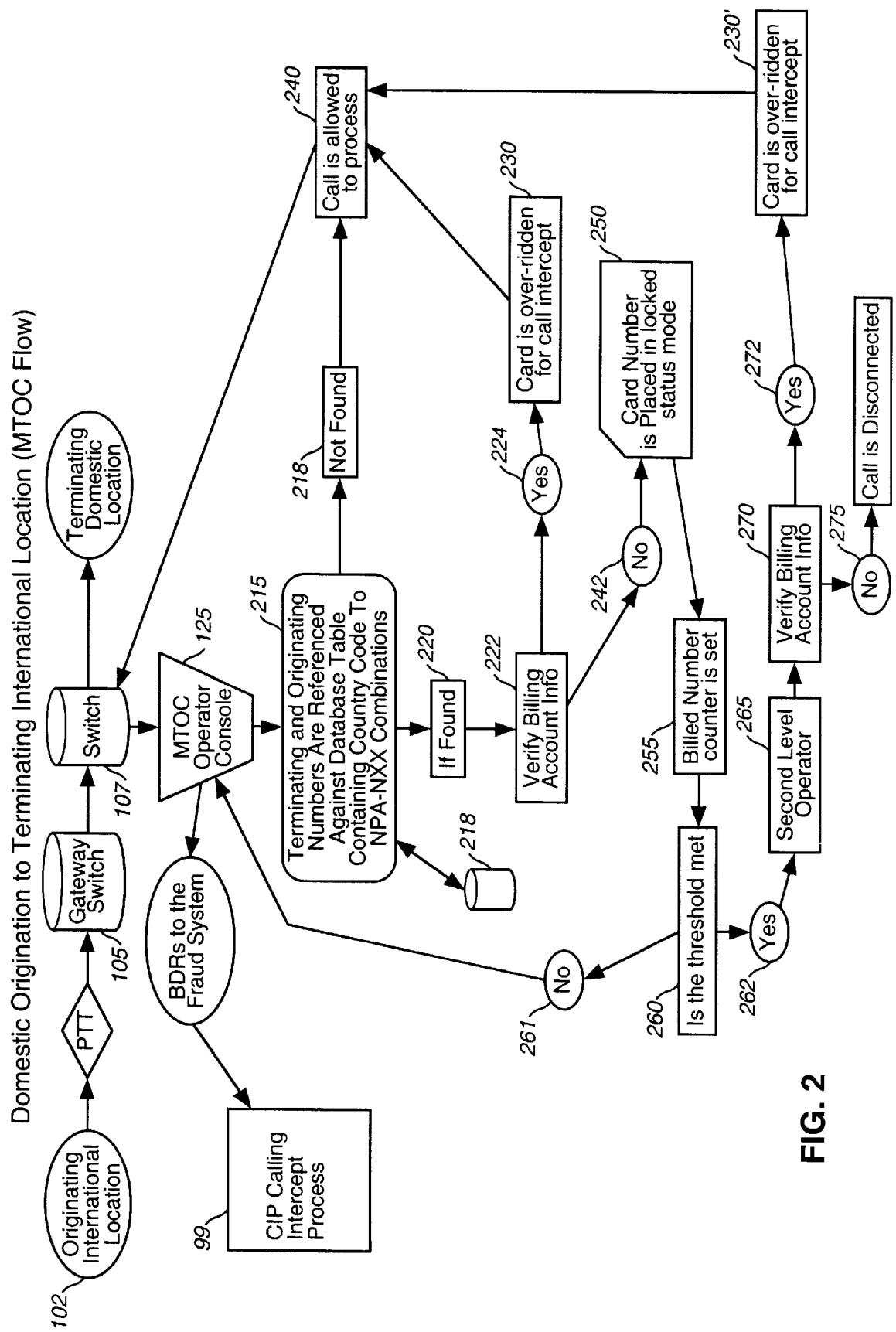
FIG. 2 illustrates a telecommunication system implementing the call intercept process for calls originating from international locations to domestic terminations according to a second embodiment of the invention.

As shown in the process flow diagram of FIG. 2, a first calling card call attempt from international origination to domestic termination may first be routed to an MTOC 125 via the switch 107, bypassing the ARU level of screening. At block 215, the MTOC operator will prompt the caller for calling card and desired domestic terminating number. The MTOC console will then reference the originating country location and terminating number against the Screening of International Call Intercept Database table at block 218. If the originating country code and NPA-NXX termination combination is not found in the Call Intercept database table at block 218, the card is allowed to process as indicated at block 240 and is routed via terminating switch 107 to the domestic termination. If the originating country and terminating number combination is found at block 220 in the Screening of International Call Intercept Database table, the MTOC operator will prompt the caller for correct name and address as it appears on the billing account at block 222.

If the caller provides correct information at block 224, the card is over-ridden for call intercept using the CIP logic at block 230 and the call is allowed to process at 240. That is, the calling card number is assigned the 'Override' status. If the caller provides incorrect name and address or disconnects the call at 242, the call is denied and the card is placed in the Intercept-Locked status mode via the CIP at 250. That is, the calling card number is assigned the 'Intercept-Locked' flag which will require further verification for subsequent calls made using that calling card number. Thus, the next time the calling card number is used, regardless of the terminating location, the MTOC operator will attempt to verify name and address.

Then, as indicated at 255, the billing number counter is incremented to track the number of calling card attempts using that calling card. If the calling call failure threshold is not met at block 261, the call is returned to the MTOC which generates the billing data record indicating the Intercept-Locked status mode for the database. Furthermore, the card number will remain in the BNS database assigned the Intercept-Locked status mode. If the caller fails a predefined number of times, e.g., five (5) times, at the MTOC, as indicated at blocks 260, 262, the caller is then transferred to a second level operator, as indicated at block 265. Preferably, a 'Transfer to $2^{nd}$ level' flag associated with the calling card is set at this step. The second level operator will then attempt to verify the identity of the caller, i.e., verify billing account information pertaining to the calling card, as indicated at block 270. At block 272 if the caller provides the correct account information, the card is over-ridden for call intercept at block 230' and the call is allowed to process (block 240). If the caller provides incorrect name and address at 275 or disconnects the call at 278, the card number will stay in Intercept-Locked status mode.

It is understood that a CIP Call Intercept process 99 is implemented to set the calling card in the different modes for Call Intercept. Particularly, as shown in FIGS. 1 and 2, the Call Intercept Process is a mainframe program that, in real-time, receives data feeds, e.g., in the form of call detail or billing detail records, from the operator ARU 115 and MTOC 125 consoles. The data received from these records are populated with unique 'Override' 'Intercept-locked' and 'Transfer to $2^{nd}$ level' flag values set to allow the CIP program to determine how to treat the calling card based on the outcome of the intercepted call. A list of the types of conditions that may occur at the operator platform, that result in the setting of the unique flags in the call record, is now provided. It is understood that, based on these flags, Call Intercept will set the calling card accordingly for treatment into a Billed Number Screening (BNS) database.

Figure 3:
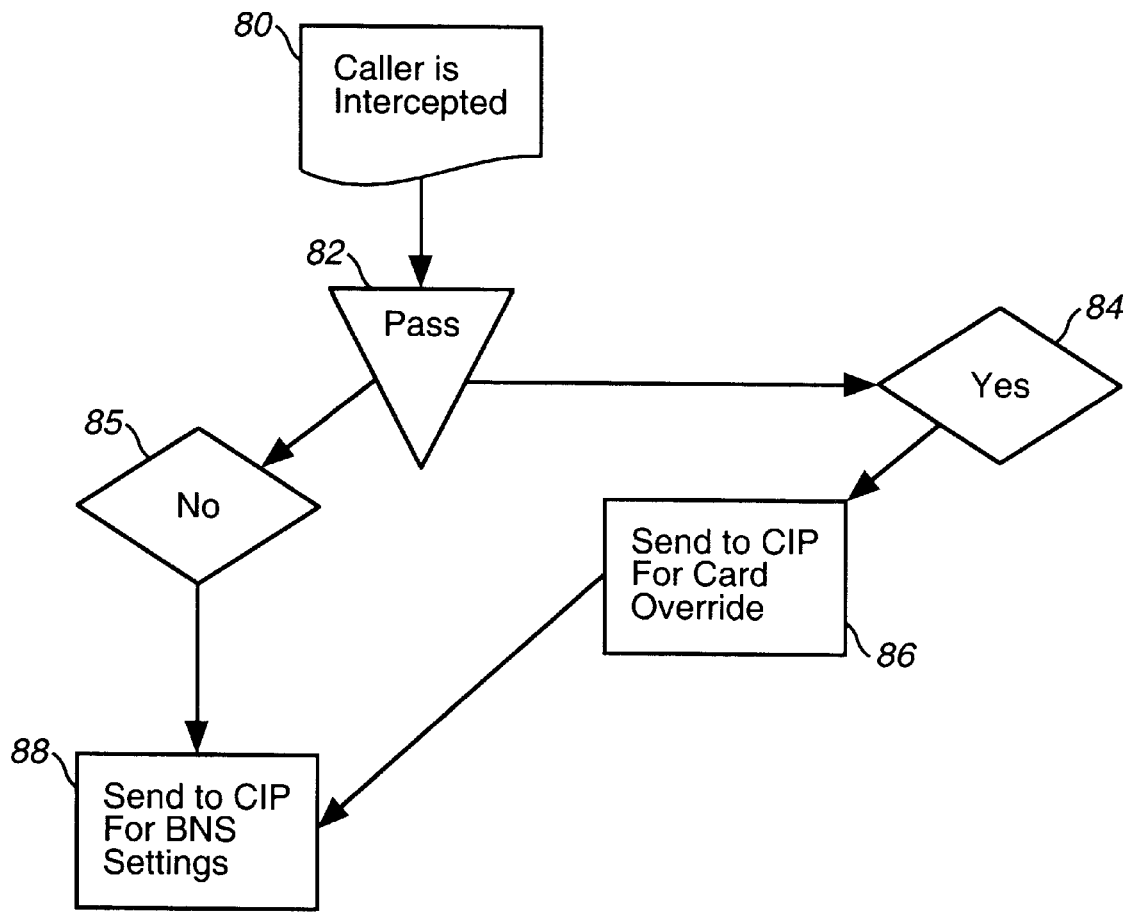
FIG. 3 is a flow diagram depicting the call intercept process mainframe program.

Particularly, as shown in the mainframe CIP process 80 of FIG. 3, at the first call intercept phase 82 initiated at the time a first calling card call is made, if the caller passed account verification at step 84, the CIP program 99 will set the flag on the card to 'Override' at step 86 and place the calling card in the BNS (Billed Number Screening) database 120 as indicated at step 88. This will allow any future calls to ignore this call from intercept treatment via the operator sites. If, at step 85, the caller fails account verification on first call intercept, or even disconnects before entering any information, the CIP program 99 will place the caller in the 'Locked Status Mode' and update the call record in the BNS database with this flag setting (step 86). Any additional calls that take place on the card having this associated status, regardless of termination, will be intercepted.

The CIP program has a configurable counter that allows the callers to be routed to another operator group if the caller continues to fail call intercept over time. Once the counter meets or exceeds the pre-set threshold, the CIP program will place the card in BNS with a 'Transfer to $2_{nd}$ Level' flag set. All additional calls will be routed to the second level operator/customer service operator group regardless of where the caller dialed to terminate.

In each of the above cases, at anytime the caller passed account information, the caller is overridden from future intercepts.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for detecting fraudulent calling card calls placed from an originating international location to a domestic termination, said system comprising:

switch device for receiving a calling card call placed from an originating international location and capable of routing said call to a desired domestic termination;

a device for automatically comparing a country code associated with said originating location and the desired domestic termination number against a database comprising combinations of country codes and termination numbers predefined as being high fraud risk;

a device for routing the calling card call to a first level operator if a match against said database is found, said first level operator for verifying billing account information corresponding to said calling card; and, a device for terminating said calling card call when said billing information is not verified, wherein subsequent calling card call attempts from originating international locations will result in default routing of said call to a first level operator for billing account information verification corresponding to said calling card, said calling card call being enabled for processing upon successful verification of billing account information, and terminated otherwise.

2. The system as claimed in claim 1, further including means for limiting a number of subsequent calling card call attempts from originating international locations to domestic locations upon failure of verification of billing account information, said system further including device for routing said calling card call to a second level operator for verifying identity of the caller after a pre-determined number of calling card call attempts.

3. The system as claimed in claim 1, wherein said means for terminating said calling card call when said billing information is not verified includes placing said calling card in a locked intercept mode.

4. The system as claimed in claim 2, wherein said second level operator performs one of: terminating said calling card call when said caller identity is not verified, and processing said calling card call upon successful verification of caller identity.

5. The system as claimed in claim 3, wherein enablement of said calling card call for processing includes removing said calling card from said locked intercept mode.

6. A method for detecting fraudulent calling card calls placed from an originating international location to a domestic termination, said method comprising the steps of:

a) receiving a calling card call placed from an originating international location at a switch capable of routing a call to a desired domestic termination;

b) routing the calling card call to a first level operator for verifying billing account information corresponding to said calling card, said first level operator performing one of: processing said calling card call upon successful verification of billing account information, and terminating said call otherwise; and, c) upon receipt of subsequent calling card call attempts from originating international locations, default routing of said calls to a first level operator for verifying billing account information corresponding to said calling card, said first level operator performing one of: processing said calling card call upon successful verification of billing account information, and terminating said call otherwise.

7. The method as claimed in claim 6, wherein prior to said routing step b), the step of automatically comparing a country code associated with said originating location and the desired domestic termination number against a database comprising combinations of country codes and termination numbers predefined as being high fraud risk, said calling card call being routed to said first level operator if a match against said database is found.

8. The method as claimed in claim 6, wherein step c) further includes the steps of:

limiting a number of subsequent calling card call attempts from originating international locations to domestic locations upon failure of verification of billing account information; and, routing said calling card call to a second level operator for verifying identity of the caller after a pre-determined number of calling card call attempts.

9. The method as claimed in claim 6, wherein said step of terminating said calling card call when said billing information is not verified includes placing said calling card in a locked intercept mode.

10. The method as claimed in claim 9, wherein said step of processing said calling card call upon successful verification of billing account information includes removing said calling card from said locked intercept mode.

11. A hierarchical method for detecting fraudulent calling card calls placed from an originating international location to a domestic termination, said method comprising the steps of:

a) receiving a calling card call placed from an originating international location to an switch for routing a call to a desired domestic termination;

b) providing first level of calling card fraud detection by automatically comparing a country code associated with said originating location and the desired domestic termination number against a database comprising combinations of country codes and termination numbers predefined as being high fraud risk;

c) providing second level of calling card fraud detection by routing the calling card call to a first level operator if a match against said database is found and processing said call otherwise, said first level operator for verifying billing account information corresponding to said calling card and performing one of: terminating said calling card call when said billing information is not verified, and processing said calling card call upon successful verification of billing account information; and, d) upon each of a predefined number of subsequent attempts of calling card number calls placed from international originations, automatically routing said calls to a first level operator for verifying billing account information corresponding to said calling card, and processing said calling card call upon successful verification of billing account information, and terminating said call otherwise; and, e) after a predefined number of subsequent attempts have been made, routing said calling card call to a second level operator for verifying identity of the caller, said second level operator performing one of: terminating said calling card call when said caller identity is not verified, and processing said calling card call upon successful verification of caller identity.

* * * * *